United States Patent [19]
Yamazaki et al.

[11] Patent Number: 5,406,048
[45] Date of Patent: Apr. 11, 1995

[54] OPTICAL PATH LENGTH FIXING APPARATUS FOR A LASER PROCESSING MACHINE

[75] Inventors: Etsuo Yamazaki, Kitatsuru; Yoshinori Nakata, Oshino, both of Japan

[73] Assignee: Fanuc Ltd., Minamitsuru, Japan

[21] Appl. No.: 64,102

[22] PCT Filed: Sep. 25, 1992

[86] PCT No.: PCT/JP92/01223
§ 371 Date: May 21, 1993
§ 102(e) Date: May 21, 1993

[87] PCT Pub. No.: WO93/05921
PCT Pub. Date: Apr. 1, 1993

[30] Foreign Application Priority Data
Sep. 26, 1991 [JP] Japan .................. 3-273500
May 13, 1992 [JP] Japan .................. 4-146927

[51] Int. Cl.$^6$ .................................................. B23K 26/02
[52] U.S. Cl. ............................................. 219/121.78
[58] Field of Search ................................ 219/121.78

[56] References Cited

U.S. PATENT DOCUMENTS

| | | | |
|---|---|---|---|
| 5,038,015 | 8/1991 | Einav et al. | 219/121.78 |
| 5,089,683 | 2/1992 | Stephenson et al. | 219/121.78 |
| 5,237,151 | 8/1993 | Maruyama | 219/121.78 |

FOREIGN PATENT DOCUMENTS

| | | |
|---|---|---|
| 60-199586 | 10/1985 | Japan . |
| 3-189090 | 8/1991 | Japan . |
| 4-182090 | 6/1992 | Japan . |

*Primary Examiner*—C. L. Albritton
*Attorney, Agent, or Firm*—Staas & Halsey

[57] ABSTRACT

An apparatus in which the length of a propagation path from a laser oscillator (6) to condensing means (a6) of a processing head (5), that is, the optical path length, in a laser processing machine (1), can be freely fixed to a set value. In the laser processing machine (1) of a multi-axis control type designed so that the processing head (5) is driven in the directions of a plurality of axes (X, Y and Z axes) with respect to the body of the laser processing machine by means of head drive means, an optical path length expansion mechanism for extending or contracting the length of an optical path from the laser oscillator (6) to the condensing means (a6) independently of the motion of the processing head (5) is inserted in the middle of the propagation path. For the optical path length expansion mechanism, optical path length control means is combined with optical path length setting means. An axis movement computing means for computing the sum total of axial movements for each axis which drives processing head 5 is provided, and half the value computed by the axis movement computing means is inputted in the optical path length control means, thereby canceling the variation of the optical path length attributable to the movement of the processing head (5) by driving the optical path length control means.

6 Claims, 4 Drawing Sheets

OPTICAL PATH LENGTH FIXING APPARATUS FOR A LASER PROCESSING MACHINE

TECHNICAL FIELD

The present invention relates to an optical path length fixing apparatus for freely setting the length of a propagation path from a laser oscillator to condensing means of a processing head, that is, the optical path length, in a laser processing machine, and continuing to fix the set value during processing operation.

BACKGROUND ART

In a laser processing machine, the distance of propagation from the outlet of a laser oscillator to a condensing lens is a factor which has a great influence on the workability. Although a propagation path can be fixed in a laser processing machine of a moving-workpiece type, this arrangement is unfit for high-speed processing on account of the high inertia of moving workpieces.

In a laser processing machine of a moving-processing-head type, on the other hand, the length of an optical propagation path which connects a laser oscillator and condensing means varies depending on the moved position of a processing head. In order to maintain an optical path length fit for the laser radiation characteristic, therefore, it is necessary to extend or contract the optical path length of a laser beam in some region on the propagation path, thereby continually keeping the length of the propagation path from the laser oscillator to the condensing means at an optimum value.

As a measure to attain this, a laser processing machine arranged in the following manner has already been proposed as Published Examined Japanese Patent Application No. 1-55076. In this machine, pairs of reflectors for refracting the optical path of the laser beam at 90° at a time so that the laser beam is emitted parallel to the incident beam are arranged for a specific drive axis of the processing head or separately for individual drive axes, and, according to the movement of each axis, each pair of reflectors are jointly moved for half the distance covered by each axis in the direction of the optical axis, taking advantage of the principle of running blocks, ball screw pitch ratio, or reduction gear ratio. By doing this, the length of the propagation path from the laser oscillator to the condensing means is kept constant.

In this laser processing machine disclosed in Published Examined Japanese Patent Application No. 1-55076, however, drive means for the individual axes for driving the processing head and the reflectors for the individual axes are directly linked by means of a mechanical interlocking mechanism, such as running blocks, ball screws, gears, etc., or otherwise, drive means for the reflectors are arranged separately from the drive means for the individual axes. In either case, the rotating speed of the drive means for the reflectors can adaptively be controlled only to the extent of half the moving speed of a specific drive axis for the reflectors.

Thus, if the aforementioned invention of Published Examined Japanese Patent Application No. 1-55076 is applied to a laser processing machine of a multi-axis control type in which the processing head is moved in the directions of the various axes, the length of the propagation path of the laser beam must be adjusted for each axis, in order to keep the propagation path length constant, so that an extra pair of reflectors must be arranged for each axis, thereby causing problems such as the increase in the complexity of construction and demand for high-accuracy guide members for the moving reflectors, which entail higher manufacturing cost, as well as the problem of attenuation and radiation of the laser beam.

Furthermore, in the laser processing machine disclosed in Published Examined Japanese Patent Application No. 1-55076, the pairs of reflectors, which constitute optical path length adjusting means, move directly in association with the movement of the processing head through the medium of the mechanical interlocking mechanism, such as the running blocks, ball screws, or gears, so that the length of the propagation path from the laser oscillator to the condensing means is fixed. Thus, the length of the propagation path itself cannot be adjusted in accordance with processing conditions, such as the kind of material and thickness of workpieces, and in some cases, it becomes impossible even to set an optimum propagation path length for processing.

DISCLOSURE OF THE INVENTION

The object of the present invention is to provide an optical path length fixing apparatus with a simple construction, capable of adjusting the length of a propagation path itself in accordance with processing conditions, such as the material and thickness of workpieces, without lowering the propagation efficiency, as well as capable of effecting processing under optimum processing conditions maintaining once-set propagation path length, and adapted, in particular, for use in a laser processing machine of a multi-axis control type.

In order to achieve the above object, according to the present invention provides a laser processing machine of a multi-axis control type designed so that a processing head is driven in the directions of a plurality of axes with respect to the body of the laser processing machine by means of head drive means, and a laser beam from a laser oscillator attached to the body of the processing machine passes through a propagation path, which extends parallel to the axial directions, to reach the condensing means; wherein an optical path length expansion mechanism, which is for adjusting the length of an optical path from the laser oscillator to the condensing means independently of the motion of the processing head inserted in the middle of the propagation path is combined with an optical path length control means, which is for driving the optical path length expansion mechanism in response to the movement of the processing head with respect to the expansion mechanism to cancel a variation of the optical path length attributable to the movement of the processing head, and an optical path length setting means for driving the expansion mechanism by means of an external input to set the optical path length at a target value.

Preferably, the optical path length setting means includes a return command means, which is for delivering reference position return commands to the head drive means and the optical path length expansion mechanism, and correction value storage means, which is for setting and storing a correction value equal to the difference between a reference optical path length from the laser oscillator to the condensing means of the processing head in a reference position and a target optical path length, and drives the optical path length expansion mechanism to set the target optical path length in accordance with the correction value stored in the correction value storage means, on receiving reference position return signals from the head drive control means and the optical path length expansion mechanism.

Preferably, the optical path length setting means obtains the current optical path length in accordance with the respective current positions of the individual axes for driving the processing head and the current position of the optical path length expansion mechanism, and drives the optical path length expansion mechanism in accordance with the current optical path length and the next target optical path length so that the optical path length takes the target value.

Preferably, correction value reading means for reading a correction value set on a processing program, corrective variation computing means for obtaining the difference between the correction value read by the correction value reading means and the correction value stored in the correction value storage means to compute a corrective variation, and correction value updating means for updating the correction value read by the correction value reading means and storing the updated value in the correction value storage means are provided, and the optical path length setting means drives the optical path length expansion mechanism in accordance with the corrective variation computed by the corrective variation computing means to modify the optical path length.

Preferably, the optical path length control means includes axis movement computing means for computing the sum total of movements of the individual axes for driving the processing head, and successively delivers move commands to the optical path length expansion mechanism so that the sum of the sum total of the individual axis movements, computed by the axis movement computing means, and a variation of the optical path length, extended or contracted by means of the optical path length expansion mechanism, becomes zero, thereby continually maintaining a fixed optical path length during processing operation.

Further preferably, the optical path length expansion mechanism includes not only an axis movement computing means, composed of pairs of reflectors for refracting the optical path of the laser beam at 90° at a time so that the laser beam is emitted parallel to the incident beam, and drive means for moving the reflectors in the direction of the optical axis but also the axis movement computing means for computing the sum total of movements of the individual axes to drive the processing head; half the value computed by the axis movement computing means is entered in the optical path length control means, thereby driving the optical path length expansion mechanism to cancel the variation of the optical path length attributable to the movement of the processing head so that a fixed optical path length is continually maintained during processing operation.

According to the present invention, as described above, an operator operates the return command means to deliver the reference position return commands to the head drive control means and the optical path length expansion mechanism after previously storing the correction value storage means of the optical path length fixing apparatus with the correction value corresponding to the reference length of the propagation path and the set optical path length which are determined depending on the respective reference positions of the individual axes for driving the processing head and the reference position of the optical path length expansion mechanism. Thereupon, controlling the drive of the head drive control means and the optical path length expansion mechanism causes the pairs of reflector, which constitute the optical path length expansion mechanism, and the processing head to move to their respective reference positions, so that the length of the optical path between the laser oscillator and the condensing means is restored to the reference length of the propagation path, and the reference position return signals are outputted. After detecting the reference position return signals, the optical path length setting means reads the correction value stored in the correction value storage means. If this value is positive or negative, the optical path length setting means drives the drive means of the optical path length expansion mechanism in the direction to increase or decrease the optical path length, thereby moving the pairs of reflectors in the direction of the optical axis so that the length of the optical path between the laser oscillator and the condensing means is adjusted to the set optical path length.

When the desired value of the optical path length is inputted directly by the operator in setting the optical path length, the optical path length setting means detects the respective current positions of the individual axes of the processing head and the pairs of reflectors, and computes the correction value by obtaining the difference between the current length of the propagation path, which is determined by these current positions, and the inputted set optical path length. The optical path length setting means reads the correction value computed by correction value computing means. If this value is positive or negative, the optical path length setting means drives the drive means of the optical path length expansion mechanism in the direction to increase or decrease the optical path length, thereby moving the pairs of reflectors in the direction of the optical axis so that the inputted set optical path length is set between the laser oscillator and the condensing means.

When the correction value on the processing program is read by the correction value reading means after the start of the processing operation, the corrective variation computing means computes the corrective variation by obtaining the difference between the correction value on the processing program and the correction value stored in the correction value storage means, and the correction value read from the processing program by the correction value reading means is updated and stored in the correction value storage means by the correction value updating means. The optical path length setting means reads the value of the corrective variation computed by the corrective variation computing means. If this value is positive or negative, the optical path length setting means drives the drive means of the optical path length expansion mechanism in the direction to increase or decrease the optical path length, thereby moving the pairs of reflectors in the direction of the optical axis so that a new set optical path length based on the correction value on the processing program is set between the laser oscillator and the condensing means.

After the start of the processing operation, the sum total of the movements of the individual axes for driving the processing head is computed in order by the axis movement computing means. If the sum total of the movements of the individual axes is positive or negative, the optical path length expansion mechanism is driven in the direction to decrease or increase the optical path length, in order to reduce the sum of the sum total of the movements of the individual axes and the variation of the optical path length extended or contracted by the optical path length expansion mechanism to zero by driving the pairs of reflectors in the direction of the optical axis so that the length of the propagation path between the laser oscillator and the condensing means is adjusted to the set optical path length set by the optical path length setting means.

The optical path length fixing apparatus for the laser processing machine according to the present invention is designed so that the head drive control means for driving the processing head in the directions of the individual axes and the optical path length expansion mechanism for extending or contracting the length of the propagation path can be driven independently of each other. Accordingly, the length of the propagation path will not be limited by the mechanical arrangement of each section, and the reference length of the propagation path can be set freely and modified at the start of the processing operation or during the execution of the processing program, in accordance with the processing conditions such as the material and thickness of workpieces. Also, changes in the length of the propagation path of the laser beam, which accompany the movement of the processing head, are collectively obtained by computing the sum total of the movements of the individual axes for driving the processing head, and the overall length of the propagation path is kept at a fixed value by driving the only one optical path length expansion mechanism disposed on the propagation path. Unlike the case of the conventional laser processing machine, therefore, the length of the propagation path need not be adjusted by arranging a number of reflectors and drive means for each axis. Thus, even for a laser processing machine with a processing head to be driven by a number of axes, an energy loss, such as attenuation or radiation of the laser beam, can be prevented without requiring the complicated machine arrangement, and stable processing can be continued at all times by maintaining the once set or modified optical path length.

BEST MODE OF CARRYING OUT THE INVENTION

Figure 1:
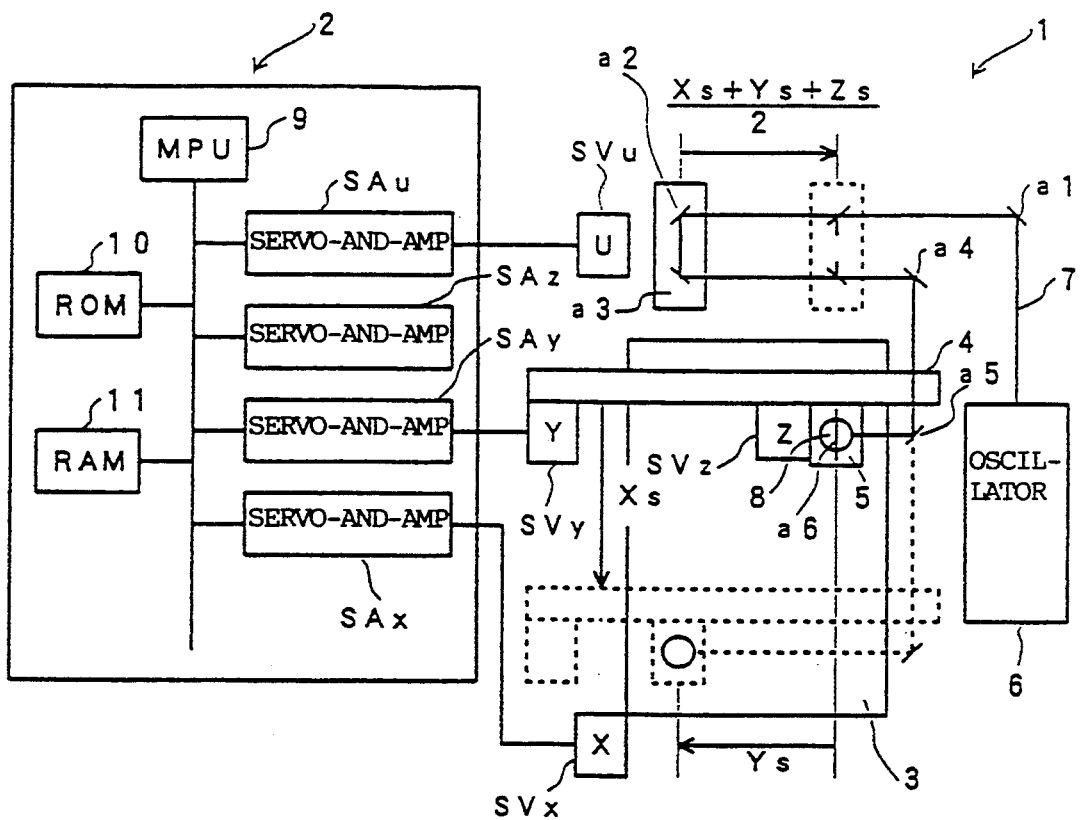
FIG. 1 is a block diagram showing the principal part of a laser processing machine according to one embodiment to which is applied an optical path length fixing apparatus of the present invention.

An embodiment of the present invention will now be described with reference to the drawings. In the block diagram of FIG. 1 showing the principal parts of a laser processing machine and an optical path length fixing apparatus, numeral 1 denotes a mechanical structure section of the laser processing machine, and numeral 2 designates an outline of a control device in the optical path length fixing apparatus.

This laser processing machine comprises a workpiece carrying table 3 fixed to the body of the laser processing machine, a moving arm 4 slidable along the longitudinal direction (hereinafter referred to as X axis) of the table 3, and a processing head 5 mounted for sliding motion along the longitudinal direction (hereinafter referred to as Y axis) of the moving arm 4 and movable in the direction (hereinafter referred to as Z axis) to approach or leave the surface of the table 3. The processing head 5 is provided with a condensing section, and the moving arm 4 and the processing head 5 are moved respectively in the axial direction by means of corresponding one of servomotors SVx, SVy and SVz for individual axes. In this embodiment, a state such that the processing head 5 is located on the upper right end portion of the table 3 as in FIG. 1, and the condensing section is retreated in the processing head 5 is defined as a reference position for each axis and the processing head 5. Also, in FIG. 1, the direction of downward movement of the processing head 5 along the longitudinal direction of the table 3 from the reference position is defined as a positive X-axis direction; the direction of leftward movement along the moving arm 4 from the reference position, as a positive Y-axis direction; and the direction of movement of the condensing section of the processing head 5 toward the surface of the table 3, as a positive Z-axis direction.

A laser oscillator 6 is mounted integrally on the processing machine body. A laser beam 7 emitted from the laser oscillator 6 is propagated by reflectors a1 to a4, which are arranged on the side of processing machine body, and is then delivered parallel to the X axis from the reflector a4. The reflectors a2 and a3 each constitute an optical path length expansion and contraction mechanism for refracting the optical path of the laser beam 7 at 90° at a time so that the beam is emitted parallel to the incident beam, thereby changing the length of a propagation path between the reflectors a1 and a4. The reflectors a2 and a3 are driven by servomotor SVu in the Y-axis direction independently of the servomotors SVx, SVy and SVz for the individual axes. As regards the moving direction of the reflectors a2 and a3, which constitutes parts of the optical path length expansion mechanism and optical path length setting means, the movement from left to right of FIG. 1, that is, in the direction to shorten the length of the propagation path, is defined as a positive-direction movement. A reference position for the optical path length expansion mechanism is set in the neutral position of the reflectors a2 and a3, that is, the position in which the reflectors a2 and a3 can move to the left or right. Various means, such as a moving screw and a rack-and-pinion mechanism, are generally known as means for converting the rotation output of each servomotor into linear motion, so that this means will not be described in particular herein.

On the other hand, the control device 2 for controlling the laser processing machine comprises a microprocessor 9 (hereinafter referred to as MPU) for use as control means, a ROM 10 stored with control programs for the MPU 9 and the like, a nonvolatile RAM 11 used for the storage of NC data for a processing program, temporary storage of computation results, etc., and servo-and-amps (servo circuits and amplifiers) SAx, SAy and SAz for use as axis controllers for controlling the drive of the servomotors SVx, SVy and SVz for the individual axes, respectively. Further, the control device 2 comprises a servo-and-amp SAu for the U axis for controlling the drive of the servomotor SVu which serves as drive means for the reflectors a2 and a3. Correction value storage means is composed of a set memory section of the RAM 11. Also, the MPU 9 constitutes part of head drive control means, optical path length expansion mechanism, optical path length setting means, optical path length control means, return command means, correction value computing means, correction value computing means, correction value reading means, corrective variation computing means, correction value updating means, and axis movement computing means.

The laser beam 7, emitted in the X-axis direction from the oscillator 6, is reflected by the reflector a1 to be refracted in the Y-axis direction, and is further reflected by the reflectors a2 and a3 to advance again in the Y-axis direction toward the reflector a4, whereupon it is refracted in the X-axis direction by the reflector a4 to be directed to a reflector a5. The laser beam 7, refracted in the Y-axis direction by the reflector a5, is refracted parallel to the Z axis by a reflector a6, which is fixed to the upper end of the processing head 5 at an angle of $\pi/4$ to an X-Y plane of the table 3, and is condensed by means of an optical lens 8 of the condensing section attached to the processing head 5, whereupon it is used to processing an object of processing on the table 3.

Figure 2:
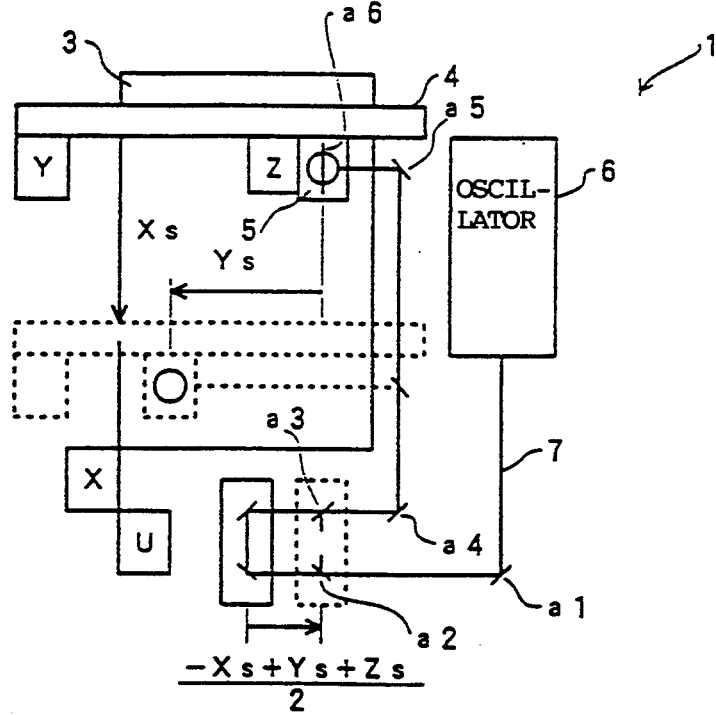
FIG. 2 is a block diagram showing another example of an arrangement of the optical path length fixing apparatus.

As the processing head 5 moves in the X-axis direction, the reflector a5 moves in the X-axis direction, as shown in FIG. 1 (and also in FIG. 2). When the processing head moves in the X- and Y-axis directions, therefore, the distances between the reflectors a4 and a5 and between the reflectors a5 and a6 vary. As the processing head 5 moves in the Z-axis direction, the length of a propagation path between the reflector a6 and the optical lens 8 also changes. Thus, the movement of the processing head is bound to entail a variation of the propagation path length.

If the processing head 5 moves for Xs and Ys in the positive X- and Y-axis directions, respectively, from the reference position, which is indicated by full line in FIG. 1, so that the processing head 5 lowers by Zs in the Z-axis direction, the length of a propagation path between the reflectors a4 and a5 and the length of a propagation path between the reflectors a5 and a6 increase by Xs and Ys, respectively, while the length of the propagation path between the reflector a6 and the optical lens 8 increases by Zs. Accordingly, the overall length of the propagation paths increases by (Xs+Ys+Zs). In order to compensate for this increment to keep the length of the propagation path constant, therefore, each of the reflectors a2 and a3, which constitute the optical path length expansion mechanism, must be moved for (Xs+Ys+Zs)/2 in the positive direction. In this case, there is the following relationship between the respective values of the movements Xs, Ys and Zs of the individual axes and the movement $\Delta L$ of the reflectors a2 and a3 which constitute the optical path length expansion mechanism.

$$\Delta L = (Xs + Ys + Zs)/2. \tag{1}$$

Here, the movements Xs, Ys and Zs are values which include plus or minus signs.

In the case of the arrangement shown in FIG. 2, however, the length of the propagation path between the reflectors a4 and a5 is shortened by the movement Xs of the processing head 5 in the positive X-axis direction, so that the sign of Xs should be inverted to modify equation (1) as follows:

$$\Delta L = (-Xs + Ys + Zs)/2. \tag{1'}$$

More specifically, if the positive moving direction of each of the X, Y, and Z axes agrees with the direction to increase the length of the propagation path in the direction of each axis, the movement L of the reflectors a2 and a3 is computed by using equation (1) and the values of the movements Xs, Ys and Zs. On the other hand, the positive moving direction of each axis agrees with the direction to shorten the length of the propagation path in the direction of each axis, the movement $\Delta L$ of the reflectors a2 and a3 is computed by using equation (1) and values obtained by inverting the respective signs of the corresponding movements Xs, Ys and Zs. In either case, the form of the equation is primarily determined by the arrangement of the apparatus. Thus, the following is a description of the case of the arrangement shown in FIG. 1, that is, the case where equation (1) holds.

When the X, Y, Z and U axes are in their respective reference positions, the propagation path of the laser beam 7 from the laser oscillator 6 to the optical lens 8 has a reference length L. The set memory section of the RAM 11, which constitutes the correction value storage means, is, through input operation of an operator, previously stored with a number of correction values $\Delta S$ for setting various optical path lengths, in accordance with the processing conditions, such as the material and thickness of workpieces. Each of these correction values $\Delta S$ is a value ($\Delta S = L' - L$) set as the difference between the reference length L of the propagation path and a desired set optical path length L'.

Figure 3:
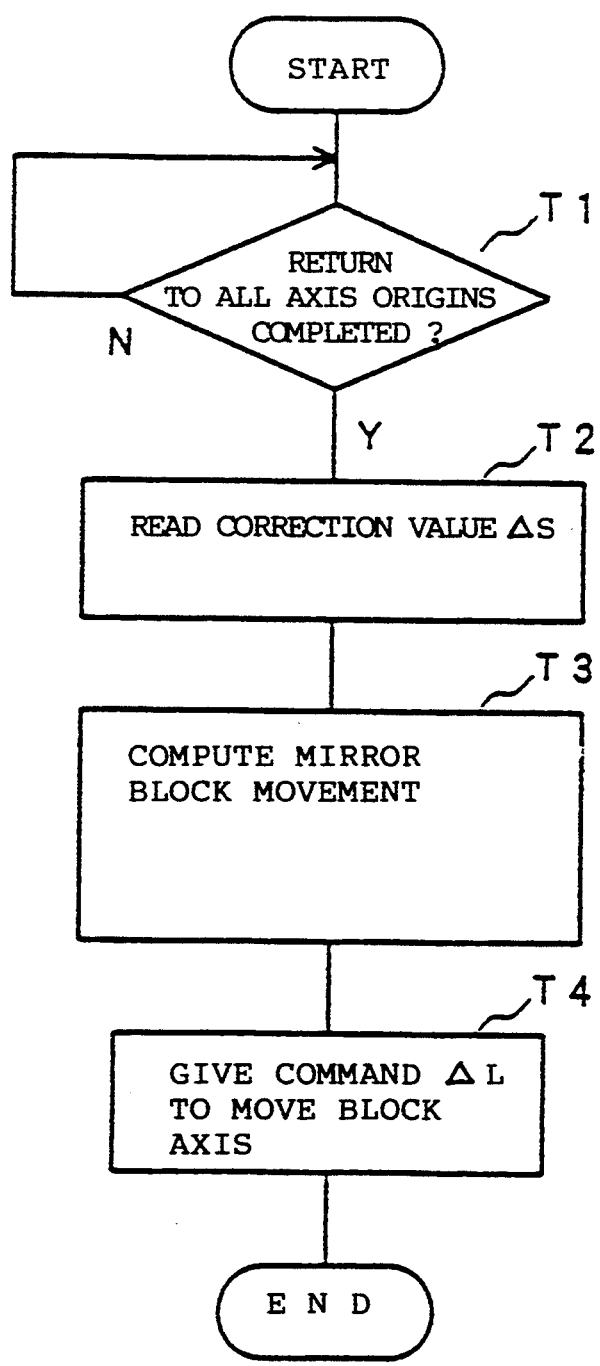
FIG. 3 is a flow chart showing an outline of an "optical path length setting routine" to be executed by means of a control device of the laser processing machine.

In changing the length of the propagation path of the laser beam 7 from the laser oscillator 6 to the optical lens 8 in accordance with the processing conditions, the operator first operates the MPU 9, by means of a keyboard (not shown) of the control device 2, to select a desired correction value $\Delta S$ from the set memory section of the RAM 11 in accordance with the processing conditions, such as the material and thickness of the workpieces, or inputs the desired correction value $\Delta S$ by means of the keyboard to store it in a buffer. Thereafter, the operator delivers reference position return commands to the servo-and-amps SAx, SAy, SAz and SAu for the individual axes by means of the MPU 9, for use as the return command means, and causes the MPU 9, used as the optical path length setting means, to start an "optical path length setting routine," as shown in the flow chart of FIG. 3. Thereupon, the servo-and-amps SAx, SAy, SAz and SAu for the individual axes, on receiving the reference position return commands, control the drive of the servomotors SVx, SVy, SVz and SVu for the individual axes, thereby restoring the processing head 5 and the reflectors a2 and a3 to their respective reference positions, and initializing the length of the propagation path of the laser beam 7 from the laser oscillator 6 to the optical lens 8 to the reference length L. On the other hand, the MPU 9, on detecting the restoration of the processing head 5 and the reflectors a2 and a3 to the reference positions in a discrimination processing of Step T1 in the "optical path length setting routine," practically starts the "optical path length setting routine."

Thereupon, the MPU 9, used as the optical path length setting means, first reads the correction value $\Delta S$, selected or inputted by means of the keyboard, from the set memory section of the RAM 11 or the buffer, temporarily stores it in a register R, used as correction value storage means (Step T2), and computes the value of the move command to be delivered to the servo-and-amp SAu for the servomotor SVu for driving the reflectors a2 and a3, as the optical path length expansion mechanism, according to the following equation (Step T3):

$$\Delta L = -\Delta S/2. \tag{2}$$

Also, the MPU 9 delivers this value $\Delta L$ as the move command to the servo-and-amp SAu, and drives the servomotor SVu to move the reflectors a2 and a3 (Step T4), thereby adjusting the distance between the laser oscillator 6 and the optical lens 8 to a value obtained by adding the correction value $\Delta S$ to the reference length L, that is, the desired set optical path length L' ($= L + \Delta S$).

In the present embodiment, the correction value $\Delta S$ for the optical path length is set as the correction value. If the aforesaid $\Delta L$ or the movement of the servomotor SVu for driving the reflectors a2 and a3 is set as the correction value, however, the processing of Step T3 is unnecessary.

According to the optical path length fixing apparatus of the present embodiment, as described above, the drive of the servo-and-amp SAu for driving the reflectors a2 and a3, for use as the optical path length setting means, can be controlled independently of the servo-and-amps SAx, SAy and SAz for the individual axes, for use as the head drive control means for driving the processing head 5, by means of the MPU 9 as the optical path length expansion mechanism. Accordingly, the length L' of the propagation path can be freely set in accordance with the processing conditions, such as the material and thickness of the workpieces, without being restricted by the hardware construction.

The register R serves as the correction value storage means for storing the newly selected or set correction value $\Delta S$. Even when the value in the register R is updated in any of subsequent processings, the correction value $\Delta S$ stored in the set memory section of the RAM 11, which constitutes the correction value storage means, can be maintained intact.

Instead of setting the set optical path length L' by using the correction value $\Delta S$, which is equal to the difference between the reference length L and the desired set optical path length L', as described above, the set optical path length L' can be set between the laser oscillator 6 and the optical lens 8 in the following manner: the value of the set optical path length L' is directly inputted by means of the keyboard; the respective current positions of the X, Y, and Z axes for driving the processing head 5 and the current position of the U axis for driving the reflectors a2 and a3 are detected from current position storage registers for the individual axes; the value of a current length L" of the propagation path from laser oscillator 6 to the optical lens 8 is obtained by means of the MPU 9; after computing the correction value $\Delta S$ according to $$\Delta S = L' - L'' \tag{3}$$

by the MPU 9, used as the correction value computing means; the value of the move command to be delivered to the servo-and-amp SAu for the servomotor SVu is computed according to equation (2) in the same manner as aforesaid; and the computed value $\Delta L$ ($= -\Delta S/2$) is delivered as the move command to the servo-and-amp SAu, thereby enabling to set an optical path length L' between laser oscillator 6 and optical lens 8.

The value of the set optical path length L', thus set between the laser oscillator 6 and the optical lens 8 in accordance with the processing conditions, must be maintained as it is by means of the optical path length control means as long as the processing is to be continued under the processing conditions at the time of the optical path length setting.

Figure 4:
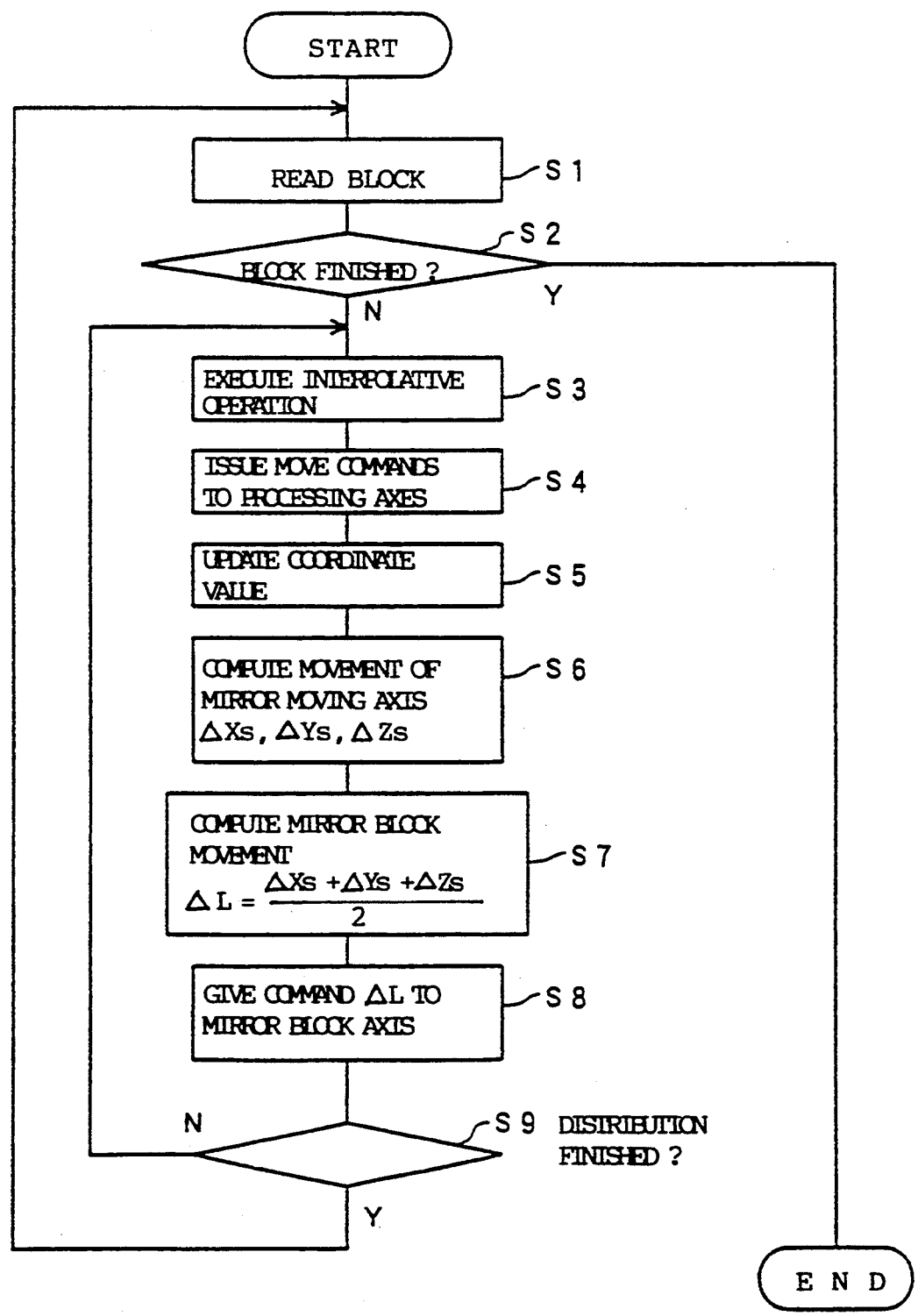
FIG. 4 is a flow chart showing an outline of an "optical path length fixing routine" to be executed by means of the control device of the laser processing machine.

FIG. 4 is a flow chart showing an outline of an "optical path length fixing routine" to be executed by the MPU 9 while the laser processing machine executes laser processing operation.

MPU 9 first reads NC data for one block from the processing program in the RAM 11 (Step S1), and determines whether or not this data is indicative of the end of the processing program or whether it is a processing move command or not (Step S2).

If the NC data is the processing move command, the MPU 9 for use as the head drive control means executes interpolative operation based on the value of this move command, thereby computing the respective values of the movements of the individual axes per unit time, that is, the numbers of distributed pulses for the individual axes to be outputted in the processing period concerned (Step S3). Further, the MPU 9 delivers the pulse numbers individually to the servo-and-amps SAx, SAy and SAz for the individual axes, thereby driving the servomotors SVx, SVy and SVz for the individual axes to move the processing head 5 and the condensing section (Step S4), and also adds the movements corresponding to the distributed pulses for the individual axes outputted in Step S4 to the values in current value registers and stores the resulting values (Step S5).

Then, the MPU 9, for use as the axis movement computing means, computes the respective values of substantial movements $\Delta Xs$, $\Delta Ys$ and $\Delta Zs$ of mirror moving axes, that is, the individual axes concerned in the increase or decrease of the optical path length of the laser beam, during the time interval between the preceding processing period and the present processing period, on the basis of the values in the current value registers for the individual axes (Step S6). The MPU 9, for use as the optical path length control means, computes, according to equation (1), the movement of the reflectors a2 and a3 for compensating for a change of the length of the propagation path, which accompanies the change of position of the processing head 5 and the condensing section attributable to the shift of the axes (Step S7). The MPU 9 delivers the resulting value $\Delta L$ as the move command to the servo-and-amp SAu, thereby driving the servomotor SVu to move the reflectors a2 and a3 (Step S8). Thus, the length of the propagation path is kept at the preset value L' of the set optical path length.

Then, the MPU 9 determines whether or not the processing for distribution to the individual axes is finished (Step S9). If the distribution is not finished, the processings of Steps S3 to S9 are repeatedly executed in the same manner as aforesaid, and distribute pulses to the individual axes to move the processing head 5 and the condensing section. Also, the MPU 9 computes the movement ΔL of the reflectors a2 and a3 for compensating for changes of the respective positions of the processing head 5 and the condensing section during the time interval between the preceding processing period and the present processing period, and drives the servomotor SVu. While moving the reflectors a2 and a3 in this manner, the MPU 9 keeps the length of the propagation path at the preset value L' of the set optical path length, and performs laser processing operation.

When the result of decision in Step S9 is YES, that is, when the termination of the distribution processing is detected, the MPU 9 reads the next block from the processing program of the RAM 11. If this block is a processing move command, the MPU 9 repeatedly executes the same processings as aforesaid. On the other hand, if a block indicative of the termination of the processing program is read (Step S2), all the processing operations given by the present processing program terminate. The axes concerned in the computation of the movements in the processings of Steps S6 and S7 are only those individual axes which are concerned in the increase or decrease of the optical path length of the laser beam. For example, if the arrangement is such that the processing is effected with the processing head 5 moved in the X- and Z-axis directions and the table 3 in the Y-axis direction, the movement of the Y axis which is not concerned in the increase or decrease of the optical path length of the laser beam is excluded from the computation.

Furthermore, since the length of the propagation path of the laser beam for proper processing is compensated within a predetermined range based on the value L' of the set optical path length, the processing will not be substantially hindered even if there has occurred any minor change of the propagation path length L' which may be caused by the movement of the processing head 5 and the condensing section. Thus, instead of modifying the positions of the reflectors a2 and a3 little by little in a short cycle, as in the case of this embodiment, the positions of the reflectors a2 and a3 may be adjusted with every processing movement of one block in the NC program.

In general, an actual processing program includes on-off operation for a laser processing power source, fast-forward feeding operation for the processing head 5, etc. In the case of the flow chart of FIG. 4, however, all the blocks in the processing program are assumed to be composed of processing move commands for simplicity of illustration. The on-off operation of the processing power source, fast-forward feeding operation for the processing head 5, etc. are performed in the same manner as the conventional ones. Also, even in the case of the fast-forward feeding operation for the processing head 5, the length of the propagation path changes as the positions of the processing head 5 and the condensing section vary. Thus, regardless of whether the processing is in progress or not, the same processings as aforesaid may be applied so that the respective positions of the reflectors a2 and a3 are continually corrected for the next processing cycle. In an alternative case such that the aforesaid processings will not be executed during the fast-forward feeding operation of the processing head 5, the movement ΔL of the reflectors a2 and a3 is computed on the basis of the sum total of the movements Xs, Ys and Zs from the reference position of the processing head 5 to the current position, and the resulting value is outputted by absolute assignment (corresponding to the processings of Steps S6 to S8), whereby the positions of the reflectors a2 and a3 are adjusted.

As described above, the optical path length fixing apparatus of the present embodiment is controlled so that the sum of the sum total of the respective movements of the individual axes for driving the processing head 5 and a variation of the optical path length, extended or contracted by means of the reflectors a2 and a3 which constitute the optical path length expansion mechanism, always becomes zero, so that the length of the propagation path from the laser oscillator 6 to the optical lens 8 can steadily be kept at the value L' of the set optical path length which has previously been set in the aforesaid "optical path length setting routine."

In the actual laser processing operation, however, it is not ensured that the laser processing operation can always be repeated under the same processing conditions set before the start of the operation. For example, depending on the workpiece shape, the thickness of the workpieces may vary in the middle of the processing operation, or in some cases, the workpieces to be processed may have to be replaced with those of different materials in the course of the operation. In such cases, the optimum value L' of the set optical path length for the processing operation varies, so that the proper processing operation sometimes cannot be continued by simply executing the aforesaid "optical path length setting routine" or "optical path length fixing routine." Thus, according to the optical path length fixing apparatus of the present embodiment, a new correction value ΔS' is given by the processing program, and the value L' of the optical path length is reset by executing an "optical path length resetting routine" based on the given value.

Figure 5:
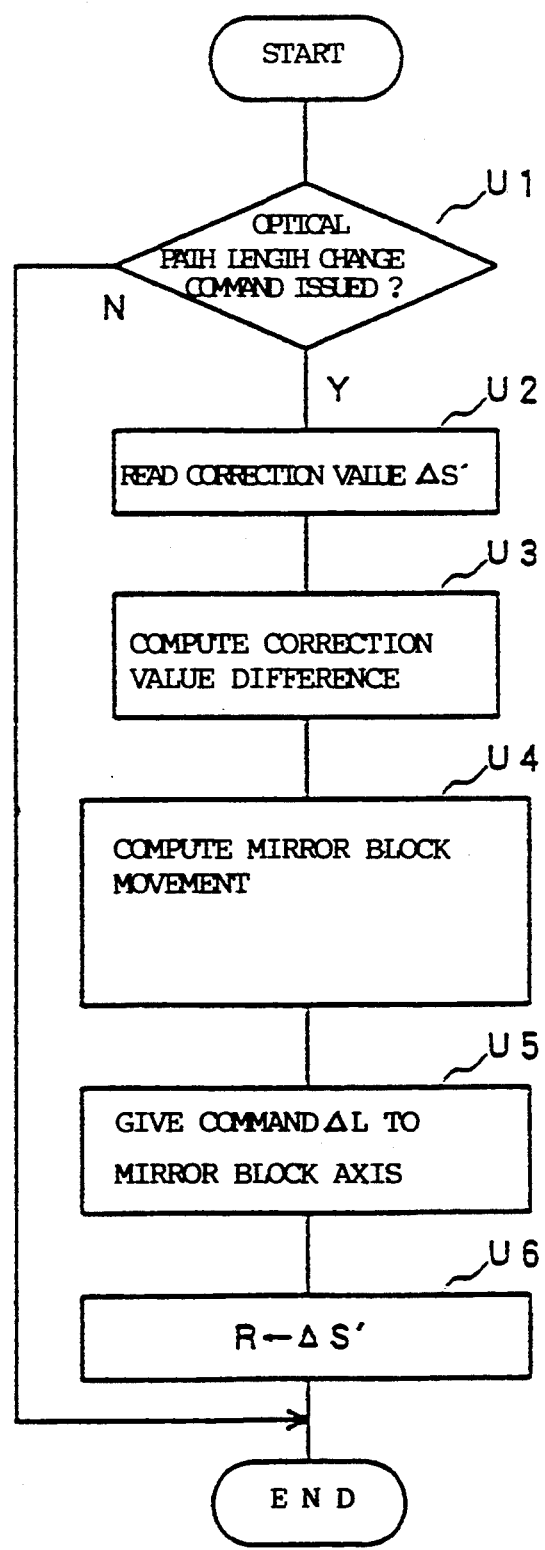
FIG. 5 is a flow chart showing an outline of an "optical path length resetting routine" to be executed by means of the control device of the laser processing machine.

FIG. 5 is a flow chart showing an outline of the "optical path length resetting routine" the MPU 9 repeatedly executes with every predetermined period, as a so-called background routine, in parallel with the aforesaid "optical path length fixing routine."

After starting the "optical path length resetting routine," the MPU 9 first determines whether or not an optical path length change command as a command for optical path length resetting is read (Step U1). Thereafter, if the optical path length change command is not read, only the discrimination processing of Step U1 is repeatedly executed in the "optical path length resetting routine" for each predetermined period, and the optical path length change command is awaited for being read.

When the optical path length change command is read during the execution of the processing program by means of various task routines including the aforesaid "optical path length fixing routine," the MPU 9, for use as the correction value reading means and corrective variation computing means, detects this in the discrimination processing of Step U1, reads the correction value ΔS', set as an operand of the optical path length change command, from the processing program (Step U2), and computes, according to the following equation, the currently set correction value ΔS, that is, a corrective variation ΔS" which is equal to the difference between the correction value ΔS, stored in the register R as the correction value storage means, and the newly read correction value ΔS' (Step U3).

$$\Delta S'' = \Delta S' - R. \quad (4)$$

Subsequently, the MPU 9, for use as the optical path length setting means, computes the value ΔL' of the move command to be delivered to the servo-and-amp SAu of the servomotor SVu for driving the reflectors a2 and a3 as the optical path length expansion mechanism, according to the following equation (Step U4):

$$\Delta L' = -\Delta S''/2. \quad (5)$$

Also, the MPU 9 delivers this value ΔL' as the move command to the servo-and-amp SAu, and drives the servomotor SVu to move the reflectors a2 and a3, thereby readjusting the distance between the laser oscillator 6 and the optical lens 8 to a value obtained by adding the corrective variation ΔS" to the optical path length L' having so far been set, that is, the set optical path length L' obtained by adding the optimum correction value ΔS' given by the processing program to the reference length L (Step U5). Further, the MPU 9, for use as the correction value updating means, updates the last read correction value ΔS', and stores the updated value in the register R as the correction value storage means (Step U6), whereupon the "optical path length resetting routine" for the processing cycle concerned is finished.

Thereafter, in the task of the aforesaid "optical path length fixing routine," the same processings as aforesaid are repeatedly executed on the basis of the set optical path length L' set in the last "optical path length resetting routine," and the MPU 9, for use as the optical path length control means, performs the laser processing operation while successively moving the respective positions of the reflectors a2 and a3 to keep the propagation path length at the value L' of the set optical path length.

When the optical path length change command and the correction value ΔS' are read during the execution of the processing program, the MPU 9, as the optical path length setting means, repeatedly executes the "optical path length resetting routine", ranging from step U1 to Step U6, in the same manner as aforesaid. Thereupon, the MPU 9 obtains the value of the corrective variation ΔS", which is equal to the difference between the currently set correction value ΔS, that is, the correction value ΔS stored in the register R as the correction value storage means, and the newly read correction value ΔS', and moves the reflectors a2 and a3 by incremental distances from their respective current positions, so that, unlike the case where the optical path length is set first, the U axis need not be driven after each axis is returned to its reference position, whereby the optical path length can be smoothly reset even in the middle of the processing operation.

According to the optical path length fixing apparatus of the present embodiment, as described herein, the optical path length L' fit for the processing conditions can easily be reset by redriving the optical path length setting means after giving the new correction value ΔS'during the execution of the processing program. Thus, the laser processing operation can be performed with the optimum optical path length maintained at all times even in case the thickness of the workpiece varies depending on the workpiece shape after the optical path length is once set. Although the "optical path length fixing routine" and the "optical path length resetting routine" have been described as being separate task routines in connection with this embodiment, whether the optical path length change command is read or not may be detected in the discrimination processing of Step S2 in the "optical path length fixing routine" before the processings of Step U2 and the subsequent steps in the "optical path length resetting routine."

We claim:

1. A laser processing machine of a multi-axis control type designed so that a processing head is driven in the directions of a plurality of axes with respect to the body of the laser processing machine by means of head drive means, and a laser beam from a laser oscillator attached to the body of said processing machine passes through a propagation path, which extends parallel to said axial directions, to reach said condensing means, wherein an optical path length fixing apparatus for the laser processing machine, which comprises an optical path length expansion mechanism for adjusting the length of an optical path from the laser oscillator to the condensing means independently of the motion of said processing head, inserted in the middle of said propagation path, and an optical path length control means for driving said optical path length expansion mechanism in response to the movement of said processing head, with respect to said expansion mechanism, thereby canceling a variation of the optical path length attributable to the movement of the processing head, is combined with an optical path length setting means for driving said expansion mechanism by means of an external input, thereby setting said optical path length at a target value.

2. An optical path length fixing apparatus for a laser processing machine according to claim 1, wherein said optical path length setting means includes return command means for delivering reference position return commands to said head drive means and said optical path length expansion mechanism, and correction value storage means for setting and storing a correction value equal to the difference between a reference optical path length from the laser oscillator to the condensing means of the processing head in a reference position and a target optical path length, and drives the optical path length expansion mechanism to set said target optical path length in accordance with the correction value stored in said correction value storage means, on receiving reference position return signals from the head drive control means and the optical path length expansion mechanism.

3. An optical path length fixing apparatus for a laser processing machine according to claim 1, wherein said optical path length setting means obtains the current optical path length in accordance with the respective current positions of the individual axes for driving the processing head and the current position of the optical path length expansion mechanism, and drives said optical path length expansion mechanism in accordance with difference between the current optical path length and the next target optical path length so that said optical path length takes the target value.

4. An optical path length fixing apparatus for a laser processing machine according to claim 2, which further comprises correction value reading means for reading a correction value set on a processing program, corrective variation computing means for obtaining the difference between the correction value read by the correction value reading means and the correction value stored in said correction value storage means, and correction value updating means for updating the correction value read by the correction value reading means and storing the updated value in said correction value storage means, and wherein said optical path length setting means drives the optical path length expansion mechanism in accordance with the corrective variation computed by the corrective variation computing means, thereby modifying the optical path length.

5. An optical path length fixing apparatus for a laser processing machine according to claim 4, wherein said optical path length control means includes axis movement computing means for computing the sum total of movements of the individual axes for driving the processing head, and successively delivers move commands to the optical path length expansion mechanism so that the sum of the sum total of the individual axis movements, computed by the axis movement computing means, and a variation of the optical path length, extended or contracted by means of the optical path length expansion mechanism, is zero, thereby continually maintaining a fixed optical path length during processing operation.

6. An optical path length fixing apparatus for a laser processing machine according to claim 4, wherein said optical path length expansion mechanism includes axis movement computing means composed of pairs of reflectors for refracting the optical path of the laser beam at 90° at a time so that the laser beam is emitted parallel to the incident beam, and drive means for moving the reflectors in the direction of the optical axis; said axis movement computing means computes the sum total of movements of the individual axes for driving the processing head, and enters half the value computed by said axis movement computing means in said optical path length control means, thereby driving said optical path length expansion mechanism to cancel the variation of the optical path length attributable to the movement of the processing head for continually maintaining a fixed optical path length during processing operation.

* * * * *

UNITED STATES PATENT AND TRADEMARK OFFICE
CERTIFICATE OF CORRECTION

PATENT NO. : 5,406,048
DATED : April 11, 1995
INVENTOR(S) : Yamazaki et al.

It is certified that error appears in the above-indentified patent and that said Letters Patent is hereby corrected as shown below:

Col. 9, line 22, change "AS" to --$\Delta$S--.

Signed and Sealed this

Twenty-seventh Day of June, 1995

Attest:

BRUCE LEHMAN

*Attesting Officer*  *Commissioner of Patents and Trademarks*